(12) United States Patent
Kleinewegen (10) Patent No.: US 11,193,545 B2
(45) Date of Patent: Dec. 7, 2021

(54) MULTI-DISK CONNECTION FOR A MULTI-DISK COUPLING AND INDUSTRIAL APPLICATION

(71) Applicant: FLENDER GMBH, Bocholt (DE)

(72) Inventor: Stefan Kleinewegen, Bocholt (DE)

(73) Assignee: FLENDER GMBH, Bocholt (DE)

( * ) Notice: Subject to any disclaimer, the term of this patent is extended or adjusted under 35 U.S.C. 154(b) by 105 days.

(21) Appl. No.: 16/673,376

(22) Filed: Nov. 4, 2019

(65) Prior Publication Data
US 2020/0141450 A1 May 7, 2020

(30) Foreign Application Priority Data
Nov. 5, 2018 (EP) ..................................... 18204362

(51) Int. Cl.
*F16D 3/79* (2006.01)
(52) U.S. Cl.
CPC ..................................... *F16D 3/79* (2013.01)
(58) Field of Classification Search
CPC ..... F16D 3/50; F16D 3/76; F16D 3/77; F16D 3/78; F16D 3/79
USPC ......................................... 464/93–96, 98, 99
See application file for complete search history.

(56) References Cited

U.S. PATENT DOCUMENTS

| | | | | |
|---|---|---|---|---|
| 1,569,839 A | * | 1/1926 | MacDonald | F16D 3/78 464/96 |
| 2,928,264 A | | 3/1960 | Goldsmith | |
| 3,985,000 A | * | 10/1976 | Hartz | F16D 3/79 464/99 |
| 6,547,666 B2 | * | 4/2003 | Kropp | F16D 3/79 464/99 |
| 10,359,079 B2 | * | 7/2019 | Sowa | F16D 3/79 |
| 10,619,678 B2 | * | 4/2020 | Kummer | F16D 3/79 |
| 10,948,023 B2 | * | 3/2021 | Kleinewegen | F16D 3/78 |
| 2003/0175092 A1 | | 9/2003 | Ohta | |
| 2016/0186816 A1 | * | 6/2016 | Voigt | F16D 3/78 464/93 |
| 2019/0234465 A1 | | 8/2019 | Klenewegen et al. | |
| 2020/0318688 A1 | * | 10/2020 | Jansen | F16D 3/78 |

FOREIGN PATENT DOCUMENTS

| | | | | |
|---|---|---|---|---|
| DE | 102011109887 A1 | * | 2/2013 | ............... F16D 3/78 |
| EP | 1347183 A1 | | 9/2003 | |
| EP | 3521648 A1 | | 8/2019 | |
| GB | 2222865 A | | 3/1990 | |
| JP | S6145629 U | | 3/1986 | |
| JP | 3755983 B2 | | 3/2006 | |
| WO | WO-2017033571 A1 | * | 3/2017 | ............... F16D 3/79 |

* cited by examiner

*Primary Examiner* — Josh Skroupa
(74) *Attorney, Agent, or Firm* — Henry M. Feiereisen LLC (57) ABSTRACT

A multi-disk coupling includes a first flange, a second flange, and a disk pack via which the first and second flanges are connected to one another in a torque-transmitting manner. A first fastener connects the multi-disk to one of the first and second flanges, and a second fastener is detachably connected to the first fastener and connected to the multi-disk via a material-fit connection.

20 Claims, 7 Drawing Sheets

MULTI-DISK CONNECTION FOR A MULTI-DISK COUPLING AND INDUSTRIAL APPLICATION

CROSS-REFERENCES TO RELATED APPLICATIONS

This application claims the priority of European Patent Application, Serial No. 18204362.0, filed Nov. 5, 2018, pursuant to 35 U.S.C. 119(a)-(d), the disclosure of which is incorporated herein by reference in its entirety as if fully set forth herein.

BACKGROUND OF THE INVENTION

The present invention relates to a multi-disk coupling and use of such a multi-disk coupling for industrial application.

The following discussion of related art is provided to assist the reader in understanding the advantages of the invention, and is not to be construed as an admission that this related art is prior art to this invention.

In a plurality of technical applications, in which drive power is to be transmitted from one shaft to another, there is the need for powerful couplings of compact dimensions. Furthermore, attempts have also been made for a corresponding coupling to be produced easily, quickly and cost-effectively and to achieve a long service life.

It would be desirable and advantageous to provide an improved multi-disk coupling to obviate prior art shortcomings and to allow use thereof for a plurality of fields of application, in particular various industrial applications.

SUMMARY OF THE INVENTION

According to one aspect of the present invention, a multi-disk coupling includes a first flange, a second flange, a disk pack via which the first and second flanges are connected to one another in a torque-transmitting manner, a first fastener connecting the disk pack to the first flange, and a second fastener detachably connected to the first fastener and connected to the disk pack via a material-fit connection.

In accordance with the present invention, the connection between the first and second flanges via the disk pack is torque-transmitting so that shaft power can be transmitted from the first flange to the second flange, or vice versa. In this process, the disk pack is connected detachably to the first flange by way of the first fastener which is embodied to transmit a tensile force. The first fastener interacts with the second fastener, so that the tensile force can be transmitted by the disk pack to the second fastener, and moreover to the first fastener. The first and second fasteners together form a detachable connection so as to allow a non-destructive separation of the first and second fasteners.

In accordance with the invention, the second fastener is connected to the disk pack by way of a material-fit connection. The material-fit connection may be punctiform or all around the second fastener. Introduction of a tensile force and/or a transverse force from the first fastener via the second fastener into the disk pack thus requires no further adjustments to the disk pack. In particular, notches, recesses and other material recesses on the disk pack which are required for instance to provide a form-fit or a frictional fit become unnecessary. Instead, the second fastener is itself configured such as to introduce a tensile force and/or transverse force into the disk pack. Stress of this type can be caused by a rotational movement of the first flange relative to the second flange, or by an axial offset or radial offset between the first and second flanges. The disk pack can therefore be constructed more easily in accordance with the invention and may, for example, hereby have an unbranched cross-section along its entire circumference. This allows for greater use of the material used for the disk pack, and thus results in a disk pack which is weight-saving and space-saving. Increased service life of the disk pack can likewise also be achieved by the improved utilization of material. As the disk pack of a multi-disk coupling is determinative for the size, in particular the respective diameter, of the first and second flanges, it is possible to configure a multi-disk coupling according to the present invention compact with respect to the external diameter.

According to another advantageous feature of the present invention, the first fastener can be embodied as a screw, as a bolt, as a threaded bolt or as a fitted bolt. Embodiments of the first fastener of this type are suited to receiving a tensile force, a compressive force and/or a transverse force and can be detached from the first flange and/or the disk pack in a nondestructive manner. The first fastener is also understood to relate to any other constructional element which allows for a corresponding detachable connection between the disk pack and the first flange. Alternatively or in addition, the second fastener can be embodied as a nut or as a welding nut so as to complement the first fastener and can be detached from the first fastener in a non-destructive manner. Furthermore, nuts and welding nuts can be easily attached to a disk pack with a material connection. A second fastener is also to be understood to relate to any constructional element which acts in a complementary manner to the first fastener, is embodied to be detachable therefrom and can be connected to the disk pack with a material connection. First and second fasteners of this type are readily available in a broad span of dimensions and quality classes and can therefore be easily structurally adjusted to the requirements of a multi-disk coupling. Furthermore, the first and second fasteners easily offer a mechanically durable connection which is suited to transmitting a tensile force, a compressive force and/or a transverse force.

According to another advantageous feature of the present invention, the material-fit connection can be embodied as a welded connection, solder connection, hard solder connection or as an adhesive connection. Furthermore, combinations of corresponding material-fit connections are also possible. Welded connections, solder connections and hard solder connections offer a high degree of strength when the disk pack and/or the second fastener are produced from a metallic material at least in sections. In this regard a welded connection offers increased strength. A solder connection or hard solder connection in turn is produced with lower process temperatures than a welded connection, so that structural changes in the disk pack are reduced. Adhesive connections can in turn be produced particularly easily and economically and offer the lowest process temperatures. Such material-fit connections can be produced with high quality and process stability and can be easily integrated into an industrial manufacturing process. A multi-disk coupling according to the present invention can therefore not only be produced easily but allows use of a plurality of materials and material combinations and thus can be adjusted to different application purposes.

According to another advantageous feature of the present invention, the material-fit connection can be established by electron beam welding or laser welding. There is a reduced heat input in the disk pack particularly when electron beam welding is involved. The disk pack may, for example, be produced from spring steel of an elasticity that can be decreased by excessive heat input. With a material fit connection between the disk pack and the second fastener, which is produced by electron beam welding, material properties of the material of the multi-disk can be retained. The disk pack can then also be produced from materials which can be degraded by heat input. The need for a cost-intensive and more demanding material to be processed for the disk pack can therefore be eliminated. Furthermore, electron beam welding can be carried out quickly, which simplifies manufacture of a multi-disk coupling according to the present invention. Alternatively or in addition, the material-fit connection can also be produced by resistance point welding. Resistance point welding offers increased energy efficiency, minimal component deformation and does not require additional materials.

According to another advantageous feature of the present invention, the multi-disk can be configured at least in a region of the second fastener devoid of any recess. This should be understood to mean that no boreholes, notches or constrictions of the cross-section of the disk pack are present in the multi-disk directly on the second fastener or in its vicinity. Because of the absence of a borehole in the region of the second fastener in particular, the multi-disk has an unbranched cross-section. For instance, form factors and/or notch factors greater than one are present on the boreholes or restrictions. In accordance with the present invention, the form factor and/or the notch factor can be reduced in a targeted manner at the corresponding point by appropriate configuration of the disk pack and/or the connection of the fastener. Detrimental effects as a result of a bearing stress are likewise avoided. Thus, these aspects can be disregarded when designing the disk pack and thus the disk pack to be constructed in a more compact manner. This in turn allows construction of a multi-disk coupling according to the present invention to be built in a space-saving manner.

According to another advantageous feature of the present invention, the second flange is detachably connected to the disk pack via the first fastener. This first fastener is in turn detachably connected to a second fastener, which is connected to the disk pack by a material-fit connection. As a result, the connection between the first flange via the first and second fasteners with the disk pack is transmitted to the second flange. Continuous application of the principle of the claimed solution in a multi-disk coupling is herewith possible in particular. Furthermore, a distance between two adjacent fasteners, which are attached on opposite sides of the disk pack, can essentially correspond to a free disk length. A free disk length, viewed along a circumferential direction of the disk pack, is to be understood to relate to the section of the disk pack which is suited to transmit tensile forces when the multi-disk coupling is exposed to a torsional stress in peripheral direction, and to transmit recoil forces caused by shaft offset in a flexible manner. The shaft offset results hereby in an axial displacement of the first and second flanges or in an inclination of the flanges relative to one another. An essentially S-shaped deformation of the disk pack between two adjacent second fasteners is effected, when the multi-disk coupling is under torsional stress in the presence of simultaneous displacement. The longer the free disk length, the higher the torsional stress the disk pack is able to absorb in the presence of an offset. Furthermore, the free disk length determines the displacement capability of the multi-disk coupling, i.e. the ability to compensate for axial offsets and/or radial offsets between the first and second flanges. Offset ability also includes the ability to compensate angular offsets between the first and second flanges. The higher the offset ability of the multi-disk coupling, the more robust it is during operation and suited to corresponding highly stressed applications. In particular, the claimed solution allows for an intended, durable operation, in which a nominal torque is present and at the same time an angular offset of up to 1° and at the same time an axial offset between the first and second flanges of up to 2 mm. The material-fit connections between the second fasteners and the disk pack are compact, so that the free disk length is increased compared with conventional multi-disk couplings of similar dimensions.

According to another advantageous feature of the present invention, a spacer can be arranged between the second fastener and the disk pack, with the material-fit connection being established between the disk pack and the spacer. The material-fit connection is hereby realized between the disk pack and the spacer. In this regard the spacer is in turn connected to the second fastener. The connection between the spacer and the second fastener can be configured detachable or non-detachable, for instance as a material-fit connection. The spacer can be embodied as a disk, socket, sleeve or shim washer, or as a shim washer stack. As a result, the spacer represents a robust constructional element. The associated, second fastener can therefore be reliably separated from the spacer and replaced by a corresponding replacement part, i.e. by a new, second fastener. In particular, with such a repair, heat input into the disk pack can be minimized or prevented. Overall, this allows a simple and rapid repair of a multi-disk coupling according to the present invention. Furthermore, the spacer is determinative for a length of the first and/or second fastener. Furthermore, a spacer of this type can be positioned precisely in a separate manufacturing step. The high dimensional stability resulting therefrom allows realization of the technical advantages of a multi-disk coupling according to the present invention to a high degree.

According to another advantageous feature of the present invention, the material-fit connection can be established directly between the first fastener and the disk pack. For example, such a material-fit connection as a direct connection can be embodied as a welded connection. As a result, the number of components and manufacturing steps are reduced and manufacture of the multi-disk coupling is simplified.

According to another advantageous feature of the present invention, the multi-disk coupling can have a surface-specific power density of 100 MW/m² to 400 MW/m², preferably of 150 MW/m² to 350 MW/m². or of 160 MW/m² to 280 MW/m². The surface-specific power density is the ratio between a permissible nominal power of the multi-disk coupling and the overall radial cross-sectional surface of the coupling, i.e. the surface of the multi-disk in cross section. Only one surface of the multi-disk is hereby considered. The surface-specific power density is governed by a following formula:

$$\Phi = \frac{M \times \omega}{(da^2 - di^2) \times \pi \times 1/4}$$

with
φ:=surface-specific power density
M:=nominal torque
ω:=nominal speed
da:=external diameter of the multi-disk
di: internal diameter of the multi-disk.

Compared to conventional approaches, a multi-disk coupling according to the present invention has increased surface-specific power density and thus can find applications in which high demands are placed on the capacity of a coupling to withstand stress and yet small dimensions are required at the same time.

According to another advantageous feature of the present invention, the first fastener, which is accepted on the first and/or second flange, can be configured to receive a transverse force. Aside from transmitting a tensile force, a deformation of the first fastener along a peripheral direction is thereby also reduced or minimized during operation. As a result, the disk pack is exposed to stress essentially along a peripheral direction. With increasing deformation of the first fastener, the more significant the S-shaped deformation of the disk pack becomes between two second fasteners, which are attached on different sides of the disk pack. The slighter the S-shaped deformation, the mechanical stress in a correspondingly bent section of the disk pack decreases as well, thereby increasing service life of the disk pack.

According to another advantageous feature of the present invention, the disk pack can have a maximum radial width which corresponds to 1.0 to 1.8 times, preferably 1.0 to 1.5 times a minimal radial width of the disk pack. Currently preferred is a maximum radial width of 1.0 to 1.2 times a minimal radial width of the disk pack. The term "radial width" relates hereby, when viewed along an axial direction on an axis of rotation of the multi-disk coupling, to a width of a peripheral surface on one side of the disk pack, which faces the first flange or second flange. The disk pack has accordingly an essentially constant radial width, which is essentially subjected to a tensile stress between two adjacent second fasteners in the peripheral direction during operation. The disk pack is hereby configured at least in a region of each second fastener free of recesses or boreholes, so that a local increase in the radial width becomes unnecessary. As a consequence, the disk pack of a multi-disk coupling according to the present invention has a reduced external diameter.

According to another advantageous feature of the present invention, the disk pack can have a substantially continuous, constant thickness. The disk pack can be embodied essentially in the manner of a strip. This is simpler and more cost-effective in terms of manufacture than a disk pack that has local increases in thickness. The disk pack can be stamped from a sheet metal and can largely be produced automatically. This applies analogously also to multi-disks having disk blades that are connected to one another layer by layer. This further renders a multi-disk coupling according to the present invention more economical.

According to another advantageous feature of the present invention, a section bearing tensile load can be present between two adjacent second fasteners, as viewed in the peripheral direction. In such a section, tensile stress caused by the torque being transmitted in the disk pack is introduced during operation. The tensile load-bearing section corresponds at least partially in the peripheral direction to the part of the disk pack which is disposed between the second fasteners which can be attached on different sides of the disk pack. A connecting line, extending between two adjacent second fasteners, essentially connects the center points of the second fasteners and the associated first fasteners to one another. The tensile load-bearing section of the disk pack is hereby configured essentially symmetrical to the connecting line. The tensile load-bearing section is bounded radially inward by an internal contour and radially outward by an external contour. The internal contour and the external contour merge on both sides along the peripheral direction into a connecting section, in which a second fastener is respectively connected to the disk pack with a material-fit. This allows for a uniform introduction of tensile stress into the disk pack, in which local increases in stress are reduced.

According to another advantageous aspect of the present invention, an industrial application includes an output unit, a drive unit, and a multi-disk coupling connecting the drive unit to the output unit in a torque-transmitting manner, with the multi-disk coupling including a first flange, a second flange, a disk pack via which the first and second flanges are connected to one another in a torque-transmitting manner, a first fastener connecting the disk pack to the first flange, and a second fastener detachably connected to the first fastener and connected to the disk pack via a material-fit connection.

The drive unit can be embodied as an output shaft of an electric motor. The output unit can in turn be embodied as an input shaft of a mechanical application, e.g. a pump. As a result of an inconstant behavior of the drive unit and/or the output unit, during operation the coupling is subjected to axial offsets, radial offsets and/or angular offsets. Inconstant behavior of the drive unit can be caused as a result of a start-up, and inconstant behavior of the output unit can be caused as a result of idling of a pump.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
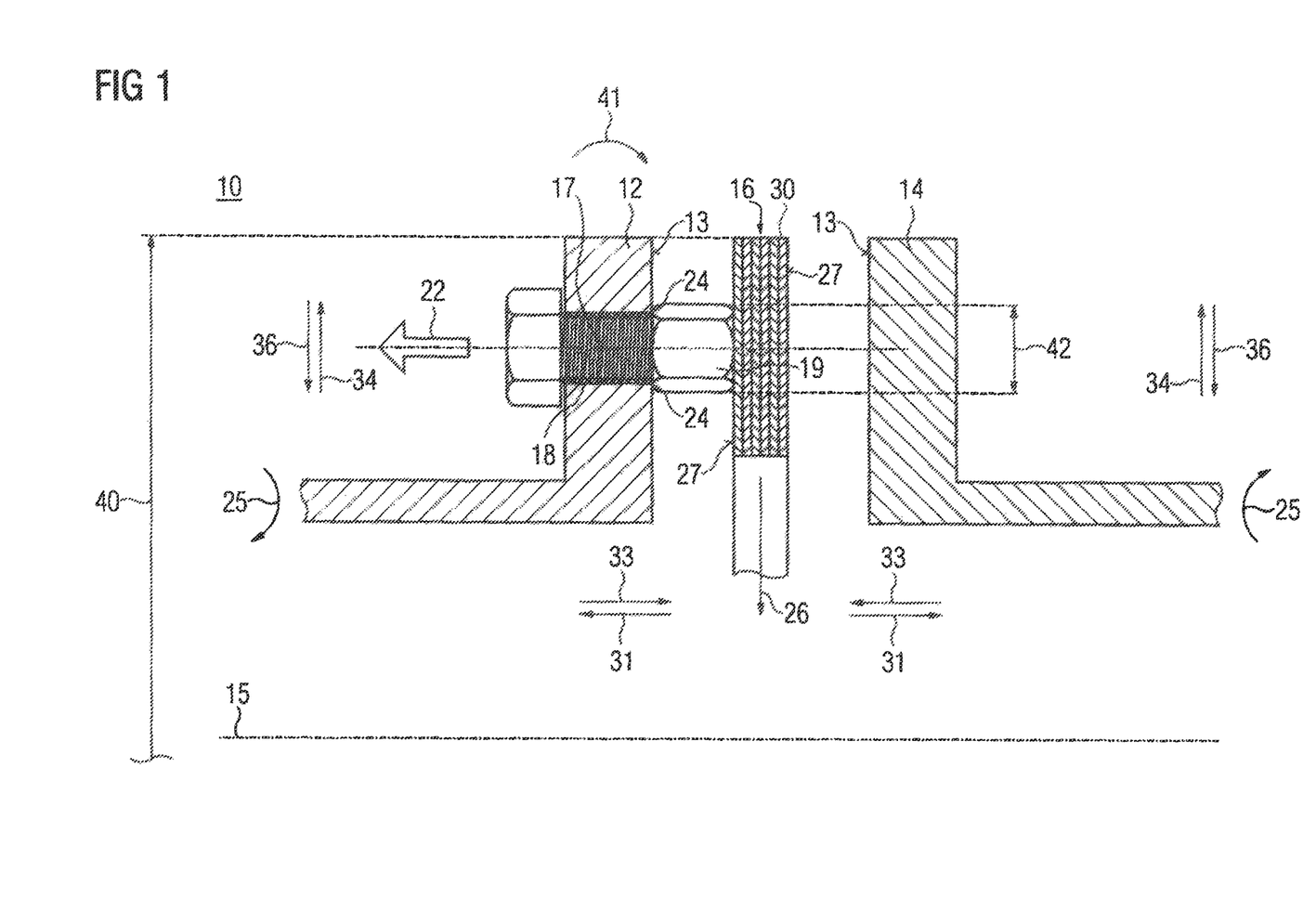
FIG. 1 is a detailed view of a first embodiment of a multi-disk coupling according to the present invention.

Turning now to the drawing, and in particular to FIG. 1, there is shown a detailed view of a first embodiment of a multi-disk coupling according to the present invention, generally designated by reference numeral 10 by way of a longitudinal section. The multi-disk coupling 10 includes a first flange 12 and a second flange 14, which face each other along a main axis of rotation 15. A torque, indicated by arrow 25, is introduced into the multi-disk coupling 10 by way of the first flange 12 and transmitted to the second flange 14. Arranged between the first and second flanges 12, 14 is a disk pack, generally designated by reference numeral 16 and including a plurality of disks 30. The first flange 12 has a recess 18 in a radial outer region of the multi-disk coupling 10 for receiving a first fastener 17. Arrow 34 indicates a radial outer direction and arrow 36 a radially inner direction. The first fastener 17, embodied by way of example as a bolt, extends through the recess 18 and is detachable from the first flange 12. An end of the first fastener 17 in facing relationship to the second flange 14 is detachably connected to a second fastener 19, which can be embodied by way of example as a nut.

In the assembled state, a tensile force, indicated by arrow 22, can be transmitted from the second fastener 19 to the first fastener 17, with the first fastener 17 being supported on the first flange 12. The second fastener 19 is supported in an axial direction, i.e. along the main axis of rotation 15, against a stop 24 on the first flange 12. The stop 24 limits the recess 18 on an axial inner end face 13 of the first flange 12, in which the first fastener 17 is received. An axial inner direction in FIG. 1 is indicated by arrow 33, an axial outer direction is indicated by arrow 31. In the assembled state, the second fastener 19 is pressed by the first fastener 17 against the first flange 12.

Figure 3:
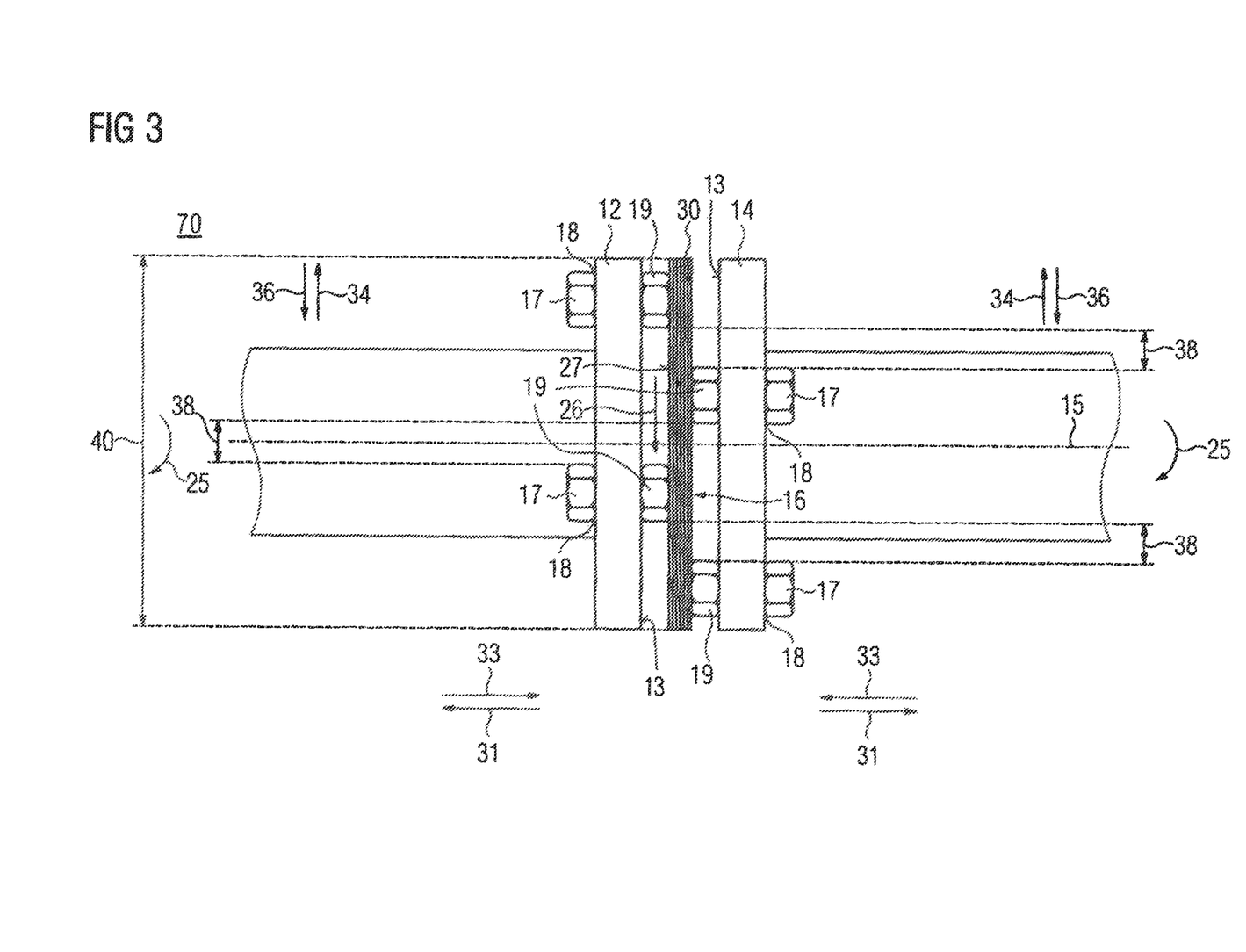
FIG. 3 is a schematic side view of a third embodiment of a multi-disk coupling according to the present invention under no load.

The second fastener 19 is arranged on an end face 27 of the disk pack 16 and is connected to the disk pack 16 via a material-fit connection. The material-fit connection is embodied as a welded connection and can be produced by means of electron beam welding. Furthermore, the material-fit connection can also be embodied to be punctiform or to run around the second fastener 19. The material-fit connection is produced directly between the second fastener 19 and the disk pack 16. As a result of the material-fit connection and the first fastener 17, which is received in the recess 18, a tensile stress, indicated by arrow 26, is induced in the disk pack 16 by a torque (arrow 25) which acts on the first flange 12 and which in turn acts on the first fastener 17 as a transverse force. As a result, torque can be transmitted from the first flange 12 to the second flange 14. Furthermore, the tensile stress induced in the disk pack 16 can be received by the first fastener 17 as bending stress, indicated by arrow 41. The second fastener 19 has a small diameter 42, by means of which a free disk length 38 described in more detail in FIG. 3 is increased. The disk pack 16 is free of boreholes or recesses in the region of the second fastener 19. The disk pack 16 is therefore also free of any stress increase caused by notch stress in boreholes. Consequently, a mechanical load-bearing capability of the disk pack 16 can be exploited even more. As a result of the material-fit connection established directly between the disk pack 16 and the second fastener 19, the multi-disk coupling 10 according to FIG. 1 requires a reduced number of components and can as a result be produced more economically. On account of the improved utilization of the material used for the disk pack 16, the disk pack 16 can be made compact. Consequently, the disk pack 16 has a reduced external diameter 40 compared with the solutions known from the prior art. The external diameter 40 also represents hereby the external diameter of the multi-disk coupling 10.

Figure 2:
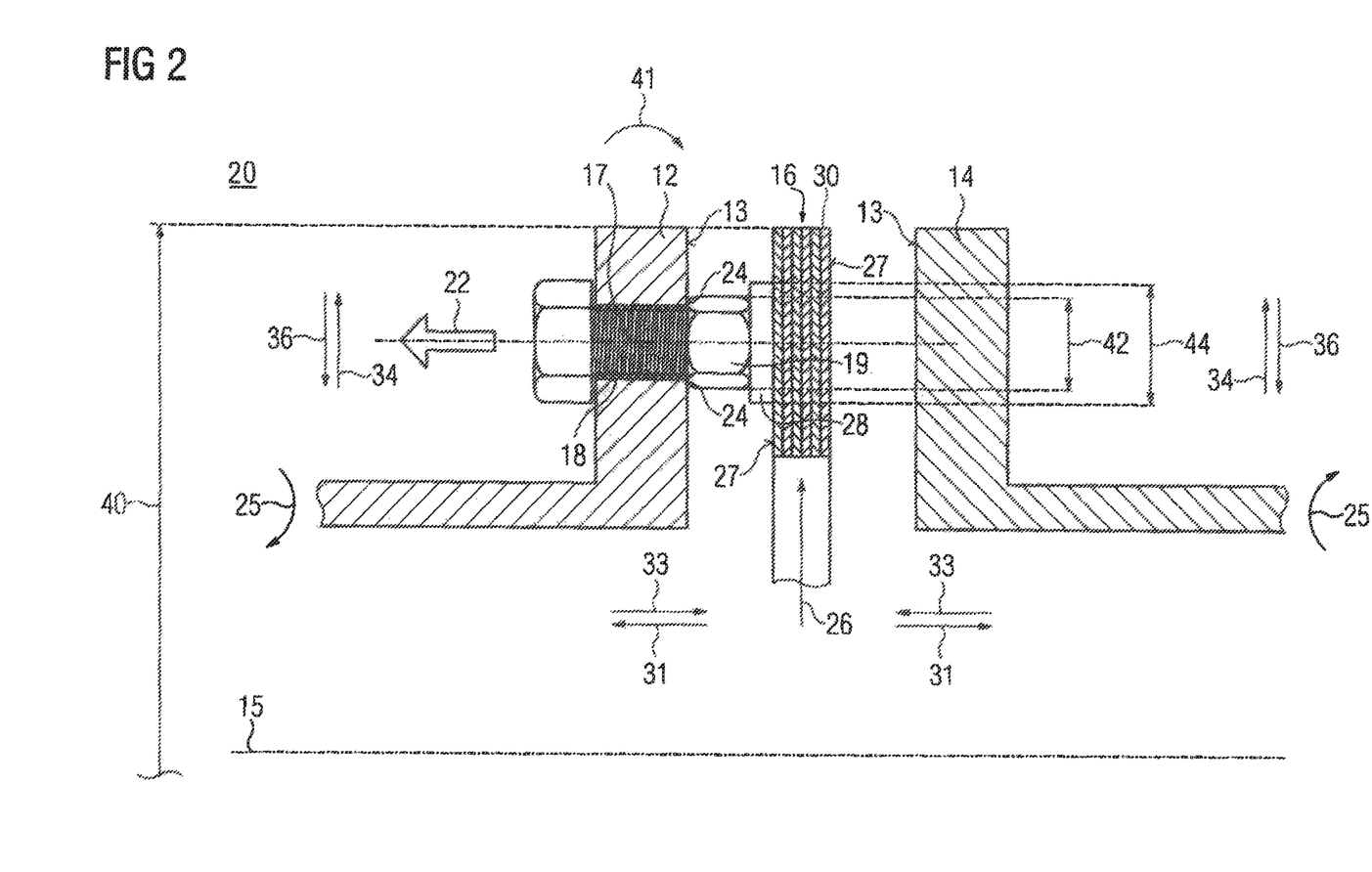
FIG. 2 is a detailed view of a second embodiment of a multi-disk coupling according to the present invention.

FIG. 2 shows a schematic representation of a detailed view of a second embodiment of a multi-disk coupling, generally designated by reference numeral 20 in a longitudinal section. Parts corresponding with those in FIG. 1 are denoted by identical reference numerals. The multi-disk coupling 20 has a first flange 12 and a second flange 14, which face each other along main axis of rotation 15. A torque, indicated by arrow 25, is introduced into the multi-disk coupling 20 by way of the first flange 12 and transmitted to the second flange 14. A disk pack 16, which includes a plurality of disks 30, is provided between the first and second flanges 12, 14. A recess 18 is embodied in the first flange 12 for receiving a first fastener 17. The recess 18 is embodied on the multi-disk coupling 20 in a radial outer region. A radial outer direction is also indicated in FIG. 2 by arrow 34, a radially inner direction by arrow 36. The first fastener 17 is embodied as a screw. The first fastener 17 extends through the recess 18 and can be detached from the first flange 12. An end of the first fastener 17 in facing relationship to the second flange 14 is detachably connected to a second fastener 19 which is embodied here by way of example as a nut. In the assembled state, a tensile force, indicated by arrow 22, can be transmitted from the second fastener 19 to the first fastener 19, wherein the first fastener 17 is embodied to be supported on the first flange 12. Furthermore, the second fastener 19 is embodied to support itself in an axial direction, i.e. along the main axis of rotation 15, against a stop 24 on the first flange 12. The stop 24 limits the recess 18 on an axial inner end face 13 of the first flange 12, in which recess the first fastener 17 is received. An axial inner direction in FIG. 2 is indicated by arrow 33, an axial outer direction is indicated by arrow 31. In the assembled state, the second fastener 19 is pressed against the first flange 12 by the first fastener 17.

In the embodiment of the multi-disk coupling 20 of FIG. 2, the second fastener 19 is arranged on a spacer 28, which is in turn arranged on end face 27 of the disk pack 16 and is connected to the disk pack 16 via a material-fit connection. The second fastening element 19 is connected to the spacer 28 via a spacer connection which is realized as material-fit connection, e.g. by welding, in particular electron beam welding. The spacer 28 is embodied as an essentially cylindrical socket. The spacer 28 can in turn be connected by way of a material-fit connection, e.g. welding, in particular electron beam welding, to the disk pack 16. An axial position of the disk pack 16 can be set by means of the spacer 28. The spacer 28 can be fastened to the disk pack 16 in a separate manufacturing step and thus high positioning accuracy can be achieved for the spacer 28. As a result, the second fastener 17 can also be accurately positioned. The spacer 28 has an external diameter 44, by means of which a free disk length 38, as shown in FIG. 3 for example, is determined. Furthermore, the spacer 28 allows for a larger surface connection of the second fastener 19 to the disk pack 16, which in turn offers improved constructive freedom. Consequently, there is the possibility of a design optimization for the connection of the second fastener 19 and the disk pack 16.

Furthermore, the material-fit connection can also be embodied to be punctiform or to run around the second fastener 19 of the spacer 46. The material-fit connection is realized between the spacer 28 and the disk pack 16. As a result, the material-fit connection between the disk pack 16 and the spacer 28 also serves to fasten the second fastener 19 on the disk pack 16. Consequently, in the first fastener 17 which is received in the recess 18, a tensile stress (arrow 26) is caused in the disk pack 16 by a torque (arrow 25) acting on the first flange 12, and acts on the first fastener 17 as a transverse force. As a result, the torque can be transferred from the first flange 12 to the second flange 14. Furthermore, tensile stress induced in the disk pack 16 can be absorbed by the first fastener 17 as bending stress indicated by arrow 41. The second fastener 19 has a diameter 42 which is smaller than the external diameter 44 of the spacer 28 and by means of which a free disk length 38 described in more detail in FIG. 3 is increased. The disk pack 16 is free of boreholes or recesses in the region of the second fastener 19. The disk pack 16 is therefore also free of stress increases caused by notch stress in boreholes. Consequently, a mechanical load-bearing capability of the disk pack 16 can be exploited even more.

As a result of the direct connection of the disk pack 16 to the second fastener 19 via the spacer element 28, the multi-disk coupling 20 according to FIG. 2 offers improved precision in terms of manufacture. In particular, in a separate manufacturing step the spacer 28 can be fastened on the disk pack 16 with high positional accuracy. Additionally the spacer 28 can be adjusted axially after connection with the disk pack 16, for instance by milling or turning. As a result, high dimensional accuracy can be achieved overall with the multi-disk coupling 20. On account of the improved utilization of the material used for the disk pack 16, the disk pack 16 can be made compact. Consequently, the disk pack 16 has a reduced external diameter 40 compared with the solutions known from the prior art. The external diameter 40 also represents hereby the external diameter of the multi-disk coupling 20.

FIG. 3 shows a schematic side view of a third embodiment of a multi-disk coupling according to the present invention, generally designated by reference numeral 70. Parts corresponding with those in FIGS. 1 and 2 are denoted by identical reference numerals. The multi-disk coupling 70 has a first flange 12 and a second flange 14, by way of which a torque indicated by arrow 25 is to be transmitted. The first and second flanges 12, 14 have an end face 13 facing one another. A disk pack, generally designated by reference numeral 16, has a plurality of disks 30 and is provided between the end faces 13 of the first and second flanges 12, 14. Recesses 18 are provided in the first and second flanges 12, 14 along an axial direction, which extends parallel to a main axis of rotation 15 of the multi-disk coupling 70, for detachably receiving first fasteners 17. The first fasteners 17 are each embodied as a screw and capable of receiving a tensile force, such as tensile force indicated by arrow 22 in FIG. 1 and FIG. 2. The first fasteners 17 interact with second fasteners 19, respectively, which are fastened to the disk pack 16. The first and second fasteners 17, 19 are detachably connected to one another, with the second fasteners 19 being configured to introduce a tensile force into the first fasteners 17. The second fasteners 19 in FIG. 3 are also embodied as nuts and are connected to the disk pack 16 via a material-fit connection, e.g. a welded connection, which is realized directly on an end face 27 of the disk pack 16.

Viewed along a peripheral direction of the disk pack 16, the disk pack 16 is provided alternately at different end faces 27 with second fasteners 19, which are in turn detachably connected to the first fasteners 17, respectively. The first fasteners 17 are, viewed along the peripheral direction of the disk pack 16, received in recesses 18 alternately on the first and second flanges 12, 14. The disk pack 16 is embodied to receive a tensile stress (arrow 26), by means of which a torque-transmitting connection can be established between the first and second flanges 12, 14. A section of the disk pack 16 between the second fasteners 19 on the different end faces 27 defines a free disk length 38. The free disk length 38 is increased by the compact shape of the second fastener 19 compared with known multi-disk couplings. The sections which define the free disk lengths 38 accommodate an axial offset and/or a radial offset between the first and second flanges 12, 14. An axial offset is possible as a result of a relative movement between the first and second flanges 12, 14 axially inward or axially outward. An axial outer direction is indicated in FIG. 3 by arrow 31, an axial inner direction by arrow 33. A radially outer direction is indicated by arrow 34 and a radially inner direction by arrow 36. Likewise, an angular offset between the first and second flanges 12, 14 can be accommodated by the disk pack 16 and can be caused by a relative rotation between the first and second flanges 12, 14 about the main axis of rotation 15. The greater the free disk length 38, the better the disk pack 16 is suited to accommodate corresponding forms of offset.

By being connected with a material fit to the disk pack 16, the second fasteners 19 are free of recesses, e.g. boreholes. Consequently, increased material utilization is possible with the disk pack 16. As a result, the disk pack 16 offers increased mechanical load-bearing capability with a reduced external diameter 40. The external diameter 40 is essentially predetermined by the disk pack 16, as a result of which the external diameter 40 of the multi-disk coupling 70 is predetermined as well. FIG. 3 shows the multi-disk coupling 70 under no load exposure, so that there is no axial offset, radial offset or angular offset between the first and second flanges 12, 14.

Figure 4:
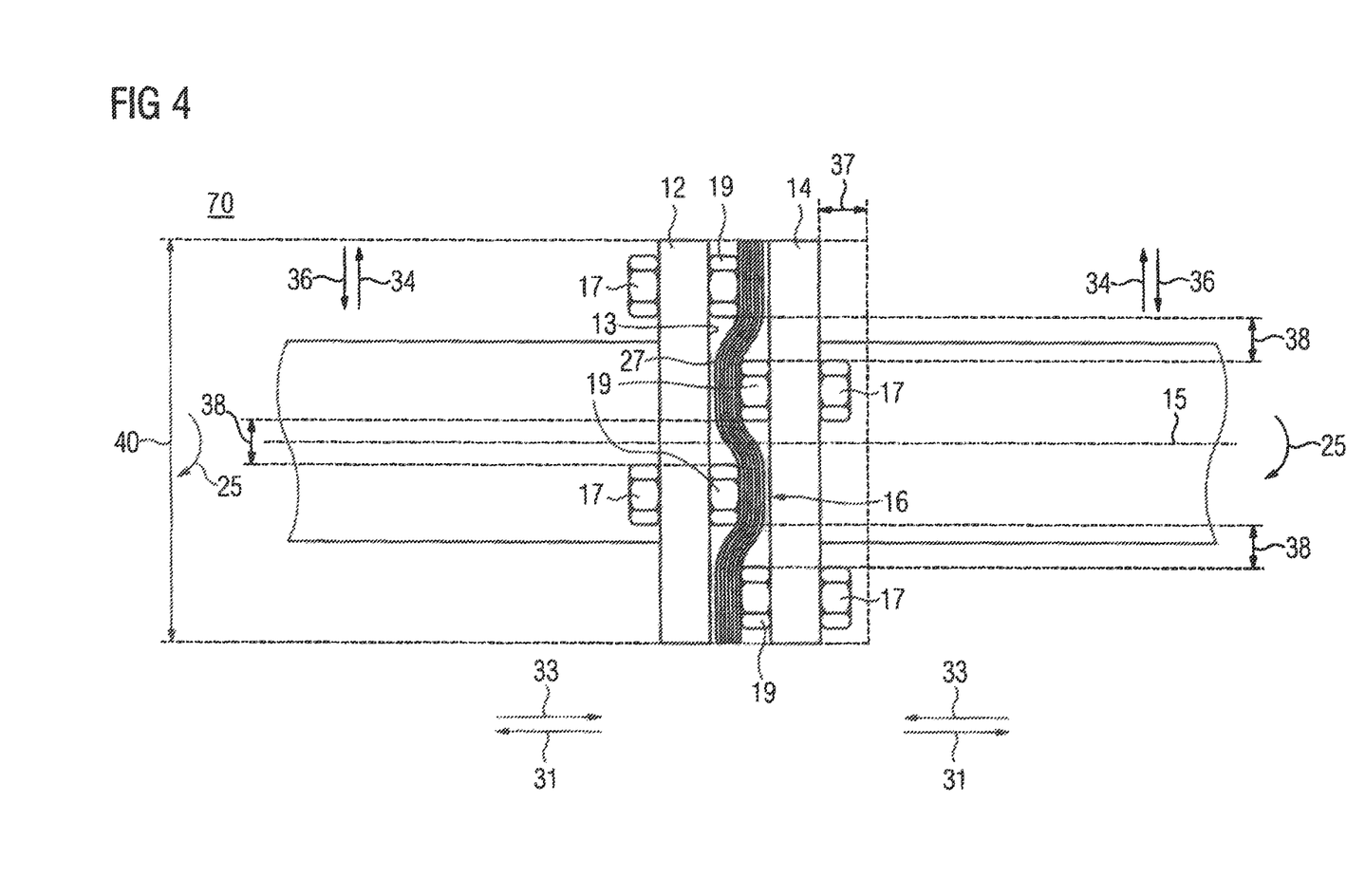
FIG. 4 is a schematic side view of the multi-disk coupling of FIG. 3 under a load.

FIG. 4 shows a side view of the multi-disk coupling 70, which is subject to an axial offset as indicated by double arrow 37. The axial offset 37 between the first and second flanges 12, 14 results in an essentially S-shaped curvature of the disk pack 16. Mechanical stress in this region is reduced by the increased free disk length 38 between the second fasteners 19. Consequently, the ability of the disk pack 16 to deform between the second fasteners 19 is utilized to a minimal degree. On the basis of constant axial offsets 37, this results in an increased service life of the multi-disk coupling 70.

Figure 5A:
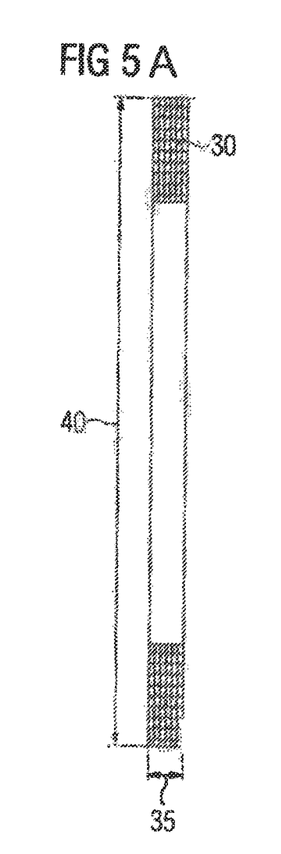
FIG. 5A is a schematic longitudinal section of a first variant of a disk pack.
Figure 5B:
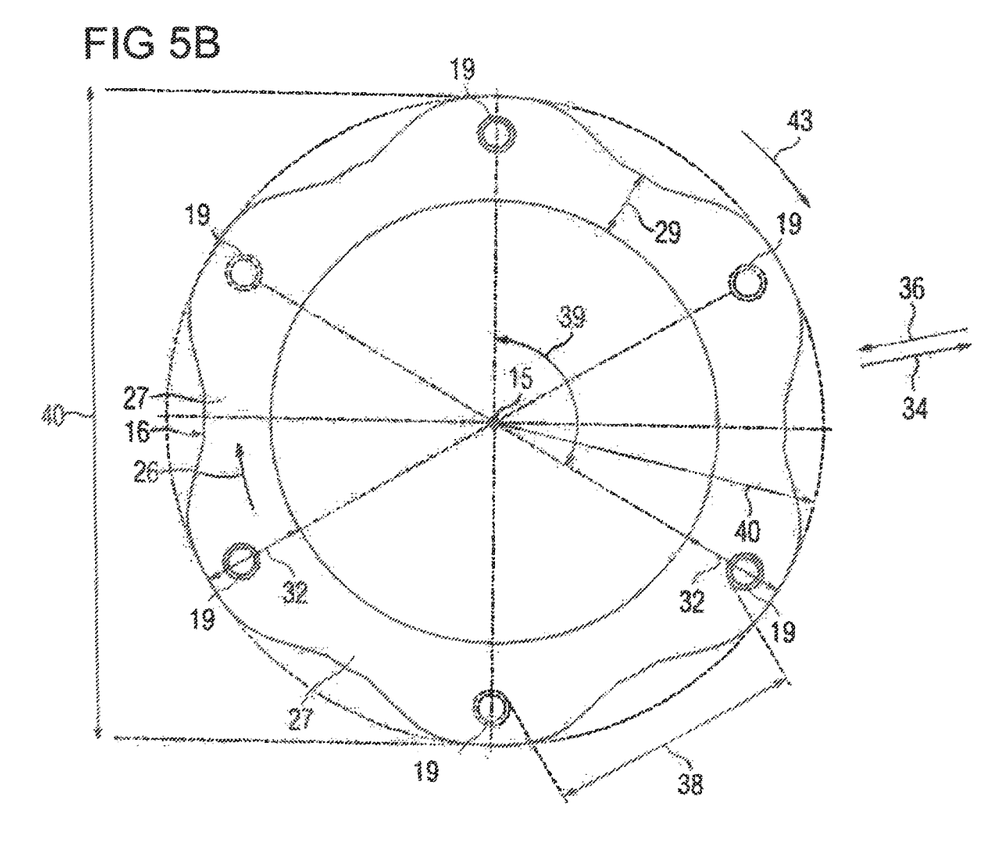
FIG. 5B is a schematic front view of the first variant of a disk pack.

Turning now to FIGS. 5A and 5B, there is shown a top view (FIG. 5B) and a longitudinal section (FIG. 5A) of a first variant of a disk pack 16. The disk pack 16 has a substantially annular configuration and is attached essentially centered on the main axis of rotation 15 in a multi-disk coupling 10, 20, 70. The disk pack 16 includes a plurality of disks 30, which are essentially connected to one another in the form of layers. The disk pack 16 has a variable radial width along a peripheral direction indicated by arrow 43. In FIG. 5B the disk pack 16 is essentially divided symmetrically with an angular pitch 39 of 120° on the shown face surface 27. The face surface 27, as shown for one side of the disk pack 16, is the surface to which the surface-specific power density of the multi-disk coupling 10, 20, 70 is related. In the region of maximum radial width 32, second fasteners 19 are attached, which are embodied by way of example as nuts. The second fasteners 19 are connected via a material-fit connection, e.g. a welded connection, to the disk pack 16. The second fasteners 19 are attached alternately on both face surfaces 27 of the disk pack 16. In the regions with maximum radial width 32, the disk pack 16 is bulged in a radial outer direction. A radial outer direction is indicated by arrow 34 and a radial inner direction by arrow 36. Regions with minimal radial width 29 are formed between the regions with maximum radial width 32.

A free disk length 38 is defined by a distance between two second fasteners 19, which are arranged adjacent to one another in the peripheral direction 43 and are fastened to different face surfaces 27 of the disk pack 16. The free disk length 38 represents hereby the deformable region which is suited to accommodate an offset between the first and second flanges 12, 14 in a multi-disk coupling, e.g. the multi-disk coupling 70, as shown in FIG. 3 and FIG. 4. The ratio between minimal radial width 29 and maximum radial width 32 is up to 1.8 in the case of the disk pack 16 according to FIGS. 5A and 5B. Because the disk pack 16 is free of recesses, such as boreholes, at least in the region of maximum radial width 29, i.e. in the region of the second fasteners 19, the entire radial width can be used to transmit a tensile stress indicated by arrow 26, by means of which a torque-transmitting connection is enabled between the first and second flanges 12, 14 of a multi-disk coupling 10, 20, 70 as shown in FIGS. 1 to 4. As the disk pack 16 is continuous, i.e. free of recesses, at least in the region of the second fasteners 19, corresponding notch stress is avoided which would require greater dimensioning of the disk pack 16. Consequently, the disk pack 16 is of reduced external diameter 40. Furthermore, the disk pack 16 has a constant thickness 35 at least viewed along the peripheral direction 43. As a result, the disk pack 16 is easy to produce and a reduced external diameter 40 can be achieved at the same time.

Figure 6A:
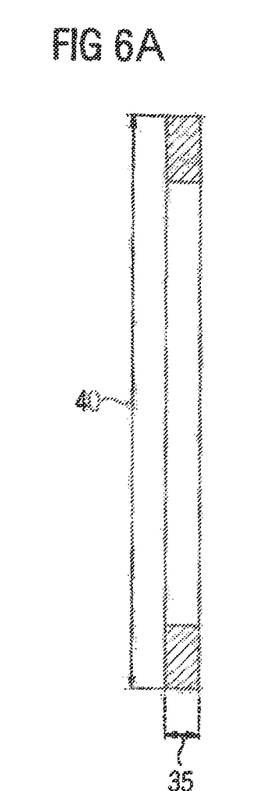
FIG. 6A is a schematic longitudinal section of a second variant of a disk pack.
Figure 6B:
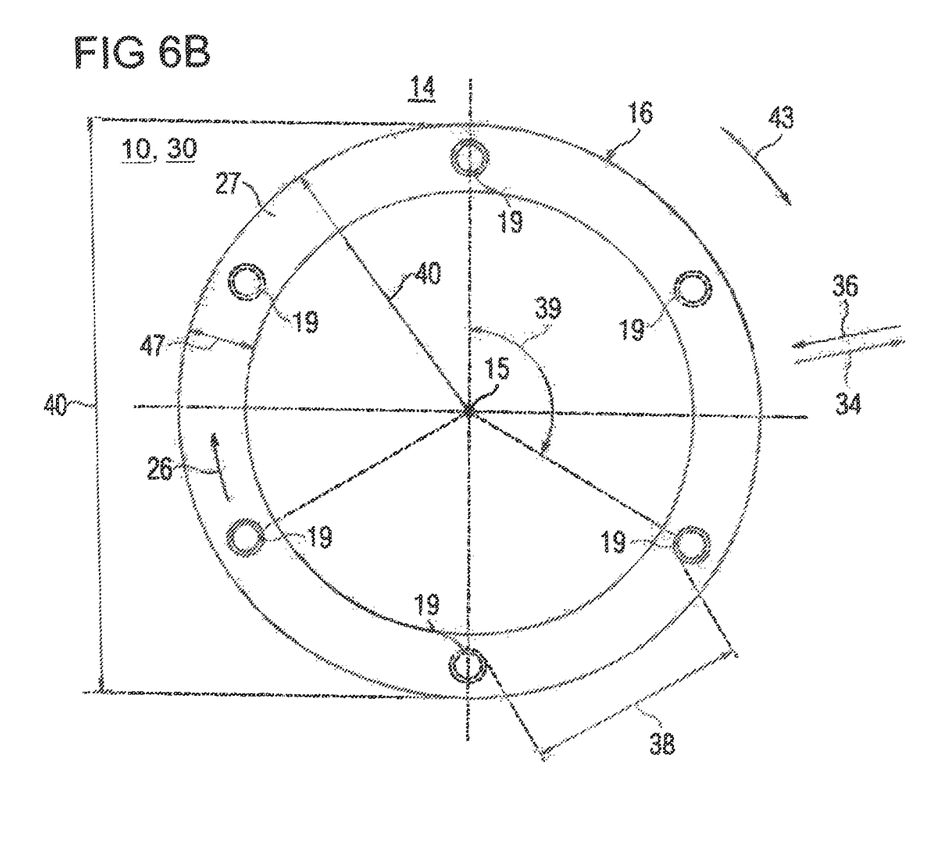
FIG. 6B is a schematic front view of the second variant of a disk pack.

FIGS. 6A and 6B show a schematic front view (FIG. 6B) and a longitudinal section (FIG. 6A) of a second variant of a disk pack 16. The disk pack 16 is embodied essentially to be annular and in an assembled state is attached essentially centered on the main axis of rotation 15 in a multi-disk coupling 10, 20, 70. The disk pack 16 includes a plurality of disks 30, which are essentially connected to one another in the form of layers. The disk pack 16 has an essentially constant radial width 47 along a peripheral direction 43. The disk pack 16 in FIGS. 6A and 6B is essentially divided symmetrically with an angular pitch 39 of 120° on the shown face surface 27. The second fasteners 19 on an end face 27 of the disk pack 16 can be configured as nuts 21 and are positioned essentially along this symmetrical partition. The second fasteners 19 are connected by a material-fit connection, e.g. a welded connection, to the disk pack 16 and are attached alternately on both face surfaces 27 of the disk pack 16. The radial width 47 is essentially constant between the individual, second fasteners 19, so that the disk pack 16 essentially has an annular shape. Furthermore, a free disk length 38 is defined by a distance between two second fasteners 19, which are arranged adjacent to one another in the peripheral direction 43 and are fastened to different face surfaces 27 of the disk pack 16. The free disk length 38 represents the deformable region and is thus suited to accommodate an offset between the first and second flanges 12, 14 in a multi-disk coupling, e.g. the multi-disk coupling 70, as shown in FIG. 3 and FIG. 4.

Because the radial width 47 is essentially constant, a minimum radial width of the disk pack 16 corresponds to a maximum radial width of the disk pack 16, so that the ratio between minimum and maximum radial widths in the disk pack 16 according to FIG. 6B is essentially 1.0. As the disk pack 16 is free of recesses, such as boreholes, at least in the region of the second fasteners 19, the entire radial width 47 is suited to transmit a tensile stress 26, by means of which a torque-transmitting connection between the first and second flanges 12, 14 of a multi-disk coupling 10, 20, 70, as shown in FIG. 1 to FIG. 4, is enabled. As a result of the disk pack 16 being embodied to be continuous, i.e. free of recesses, at least in the region of the second fasteners 19, corresponding stress peaks are avoided which would require greater dimensioning of the disk pack 16. As a result, the disk pack 16 has overall a reduced external diameter 40. Furthermore, the disk pack 16 has a constant thickness 35 at least viewed along the peripheral direction 43. As a result, the disk pack 16 can be produced easily and a reduced external diameter 40 can be achieved at the same time.

Figure 7:
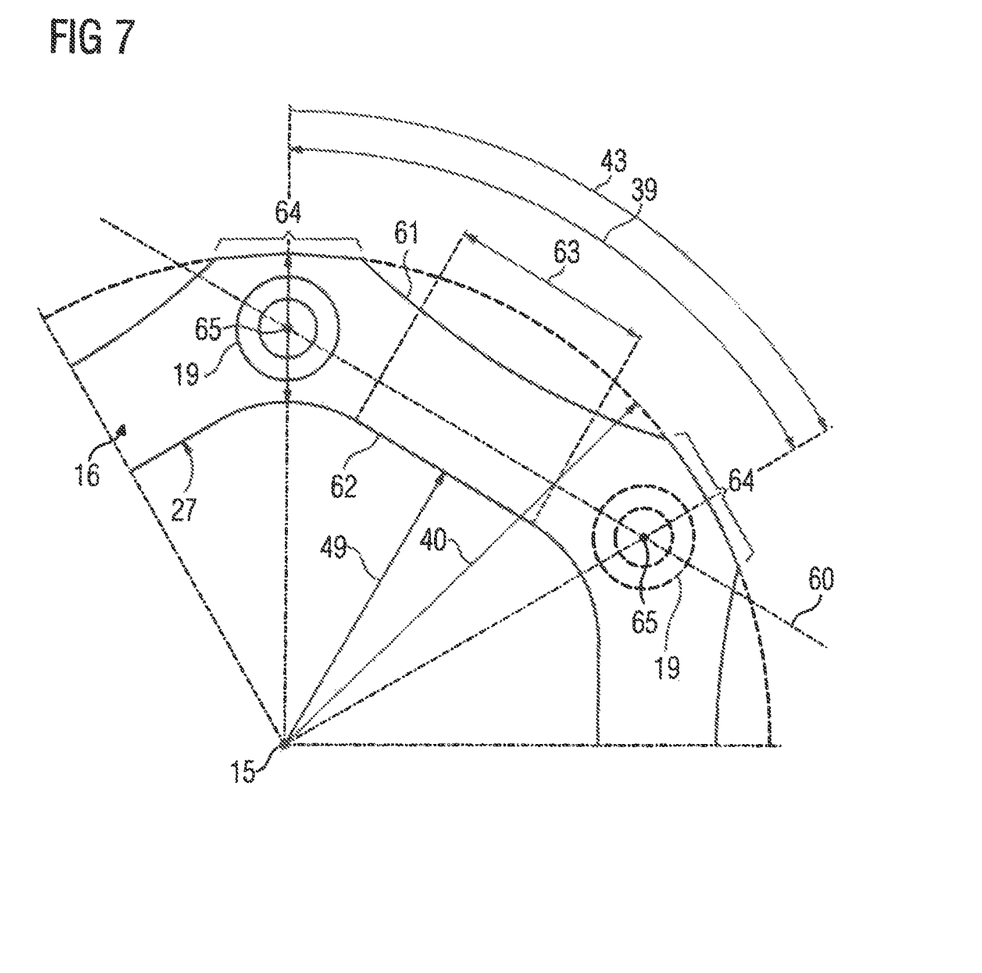
FIG. 7 is a schematic cutaway front view, on an enlarged scale, of a third variant of a disk pack.

FIG. 7 is a schematic cutaway front view, on an enlarged scale, of a third variant of a disk pack 16. Second fasteners 19 are attached alternately on both sides on the opposite end surfaces 27 of the disk pack 16, and are connected to the disk pack 16 by way of a material-fit connection. The second fastener 19 are embodied by way of example as nuts. Angular pitches 39 of essentially the same size are present between two second fastener 19, in relation to a main axis of rotation 15 of a multi-disk coupling 10, 20, 70, to which the disk pack 16 is assigned. Center points 65 of adjacent second fasteners 19 are connected to one another in pairs by a connecting line 60. A tensile load-bearing section 63 of the disk pack 16 is embodied within a field of an angular pitch 39, along the connecting line 60 between the second fasteners 19. The tensile load-bearing section 63 is subjected to tensile stress, when a torque is transmitted by the disk pack 16.

The tensile load-bearing section 63 is limited radially outward by an external contour 61 of the disk pack 16 and radially inward by an internal contour 62 of the disk pack 16. The tensile load-bearing section 63 is embodied to be essentially symmetrical in relation to the connecting line 60. Accordingly, the internal contour 62 and the external contour 61 of the disk pack 16 are embodied to be symmetrical to one another at least in sections between two second fasteners 19. The external contour 61 is embodied essentially as a concave curved line with respect to an external diameter 40 of the disk pack 16. The internal contour 62 in turn, viewed along the peripheral direction 43 of a disk pack 16, has a variable internal diameter 49. Furthermore, the tensile load-bearing section 63 transitions along the peripheral direction 43 on both sides into transition regions 64, in which the second fasteners 19 are positioned. An improved, more uniform stress distribution is achieved in the disk pack 16 on account of the shape of the tensile load-bearing section 63. As a result, an increased material utilization can be achieved in the disk pack 16, which in turn allows for a lightweight construction concept.

Figure 8:
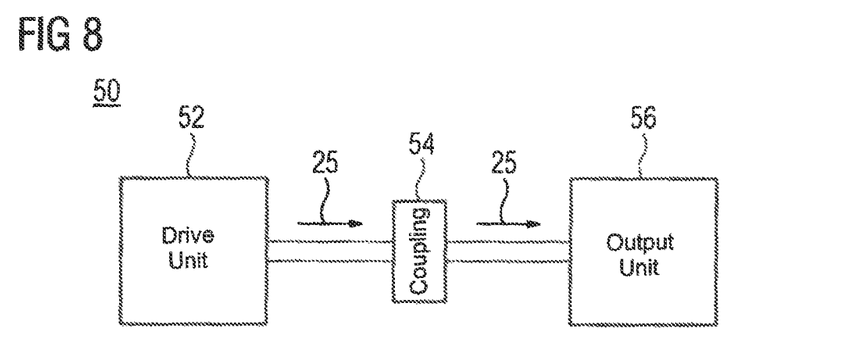
FIG. 8 is a schematic layout of an exemplified industrial application according to the present invention.

FIG. 8 shows a schematic layout of an exemplified industrial application according to the present invention, generally designated by reference numeral 50 and including a drive unit 52 to generate a torque 25 to operate an output unit 56. The drive unit 52 can be embodied as an electric motor, combustion motor, hydraulic motor or as a drive shaft. The output unit 56 can be embodied as an output shaft, a mill, vertical mill, sugar mill, cement mill, rock crusher, conveyor belt, pump, rolling press, slat conveyor, tube mill, rotary kiln, slewing gear, mixer, lifting device, garbage compactor or as a scrap press. A coupling 54 is disposed between the drive unit 52 and the output unit 56 to transmit the torque 25 from the drive unit 52 to the output unit 56. The coupling 54 is embodied as a multi-disk coupling 10, 20, 70 according to the present invention, as described above. The coupling 54 between the drive unit 52 and the output unit 56 can thus be particularly compact, produced in a simple manner and can also be attached in small installation spaces. At the same time, the coupling 54 has long service life and is essentially free of wear, as a result of which the reliability is in turn increased during operation of the industrial application 50.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A multi-disk coupling, comprising:
a first flange;
a second flange;
a disk pack via which the first and second flanges are connected to one another in a torque-transmitting manner;
a first fastener connecting the disk pack to the first flange; and
a second fastener detachably connected to the first fastener and connected to the disk pack via a material-fit connection,
wherein the disk pack is configured at least in a region of the second fastener devoid of any recess.

2. The multi-disk coupling of claim 1, wherein the first fastener is a member selected from the group consisting of a screw, bolt, threaded bolt, and fitted bolt, and the second fastener is a member selected from the group consisting of a nut and a welded nut.

3. The multi-disk coupling of claim 1, wherein the material-fit connection is embodied as a welded connection, solder connection, hard solder connection or adhesion.

4. The multi-disk coupling of claim 1, wherein the material-fit connection is established by electron beam welding or laser welding.

5. The multi-disk coupling of claim 1, wherein the second flange is detachably connected to the disk pack via the first fastener.

6. The multi-disk coupling of claim 1, further comprising a further one of said second fastener arranged in adjacent relationship to the second fastener and connected with a material fit to the disk pack, said second fasteners being spaced from one another by a distance which corresponds to a free disk length.

7. The multi-disk coupling of claim 1, further comprising a spacer arranged between the second fastener and the disk pack, said material-fit connection being established between the disk pack and the spacer.

8. The multi-disk coupling of claim 1, wherein the material-fit connection is established directly between the second fastener and the disk pack.

9. The multi-disk coupling of claim 1, wherein the multi-disk coupling has a surface-specific power density of 100 $MW/m^2$ to 400 $MW/m^2$.

10. The multi-disk coupling of claim 1, wherein the multi-disk coupling has a surface-specific power density of 150 $MW/m^2$ to 350 $MW/m^2$.

11. The multi-disk coupling of claim 1, wherein the multi-disk coupling has a surface-specific power density of 160 $MW/m^2$ to 280 $MW/m^2$.

12. The multi-disk coupling of claim 1, wherein the first fastener is configured to receive a transverse force.

13. The multi-disk coupling of claim 1, wherein the disk pack has a maximum radial width which corresponds to 1.0 to 1.8 times a minimal radial width of the disk pack.

14. The multi-disk coupling of claim 1, wherein the disk pack has a maximum radial width which corresponds to 1.0 to 1.5 times a minimal radial width of the disk pack.

15. The multi-disk coupling of claim 1, wherein the disk pack has a maximum radial width which corresponds to 1.0 to 1.2 times a minimal radial width of the disk pack.

16. The multi-disk coupling of claim 1, wherein the disk pack has a substantially continuous, constant thickness.

17. The multi-disk coupling of claim 1, further comprising a further one of said second fastener arranged in adjacent relationship to the second fastener, said disk pack having a tensile load-bearing section extending between the adjacent second fastener and further second fastener and configured with respect to a connecting line in symmetry between the adjacent second fastener and further second fastener.

18. The multi-disk coupling of claim 1, wherein the material-fit connection is a punctiform connection between the second fastener and the disk pack.

19. The multi-disk coupling of claim 1, wherein the material-fit connection extends all around the second fastener.

20. An industrial application, comprising:
an output unit;
a drive unit; and
a multi-disk coupling connecting the drive unit to the output unit in a torque-transmitting manner, said multi-disk coupling comprising a first flange, a second flange, a disk pack via which the first and second flanges are connected to one another in a torque-transmitting manner, a first fastener connecting the disk pack to the first flange, and a second fastener detachably connected to the first fastener and connected to the disk pack via a material-fit connection, wherein the disk pack is configured at least in a region of the second fastener devoid of any recess.

* * * * *